(12) United States Patent
Glenn

(10) Patent No.: US 6,667,079 B1
(45) Date of Patent: Dec. 23, 2003

(54) DECORATIVE WREATH

(76) Inventor: Edward C. Glenn, 225 Martin St., Greenville, NC (US) 27834

( * ) Notice: Subject to any disclaimer, the term of this patent is extended or adjusted under 35 U.S.C. 154(b) by 0 days.

(21) Appl. No.: 10/267,263

(22) Filed: Oct. 8, 2002

(51) Int. Cl.[7] ............................................. A47G 7/04
(52) U.S. Cl. ..................... 428/10; 47/39; 211/85.31; 211/88.03; 248/27.8
(58) Field of Search .................... 428/10, 27; 47/39, 47/41.01, 41.12, 68; 211/85.17, 85.31, 88.03; 220/485; D11/148; 248/27.8

(56) References Cited

U.S. PATENT DOCUMENTS

| | | | |
|---|---|---|---|
| 1,617,188 A | | 2/1927 | Woerner |
| 1,696,221 A | | 12/1928 | Tubbs |
| 1,889,670 A | * | 11/1932 | Knipe ..................... 211/85.23 |
| 1,920,551 A | | 8/1933 | Daum |
| 1,925,927 A | | 9/1933 | McKain |
| 2,227,187 A | | 12/1940 | Hanson |
| 3,336,697 A | * | 8/1967 | Davis ...................... 47/41.12 |
| 3,374,575 A | * | 3/1968 | Tong ........................ 47/41.12 |
| 3,591,120 A | * | 7/1971 | Fietzer et al. ............ 248/311.3 |
| 4,100,316 A | | 7/1978 | Lackey |
| 4,606,950 A | * | 8/1986 | Corbet ........................ 428/23 |
| 4,942,692 A | | 7/1990 | Colbert |
| 5,110,635 A | * | 5/1992 | Creegan ...................... 428/10 |
| 5,127,188 A | * | 7/1992 | Shaw et al. ................... 47/68 |
| 5,235,780 A | | 8/1993 | Colbert |
| 5,845,843 A | * | 12/1998 | Kuller ......................... 232/38 |
| 6,237,882 B1 | * | 5/2001 | DiMuzio ..................... 248/175 |

* cited by examiner

Primary Examiner—Deborah Jones
Assistant Examiner—Arden Sperty
(74) Attorney, Agent, or Firm—MacCord Mason PLLC

(57) ABSTRACT

A decorative artificial wreath is described that can be easily modified to render the wreath useful for a multiple of seasons. The wreath is formed of a frame with back and front sections that is covered with artificial foliage, and a plant material holder, which may include a perforated cover, inserted between the frame sections at the lower part of the frame. Optional pins extend toward the front of the wreath from the frame to support removeable seasonal objects. Different plant material, artificial and/or natural, can be placed in the holder, and different seasonal objects can be placed on the pins to adapt the wreath to different seasons or occasions, thereby providing an economical alternative to purchasing different wreaths.

20 Claims, 4 Drawing Sheets

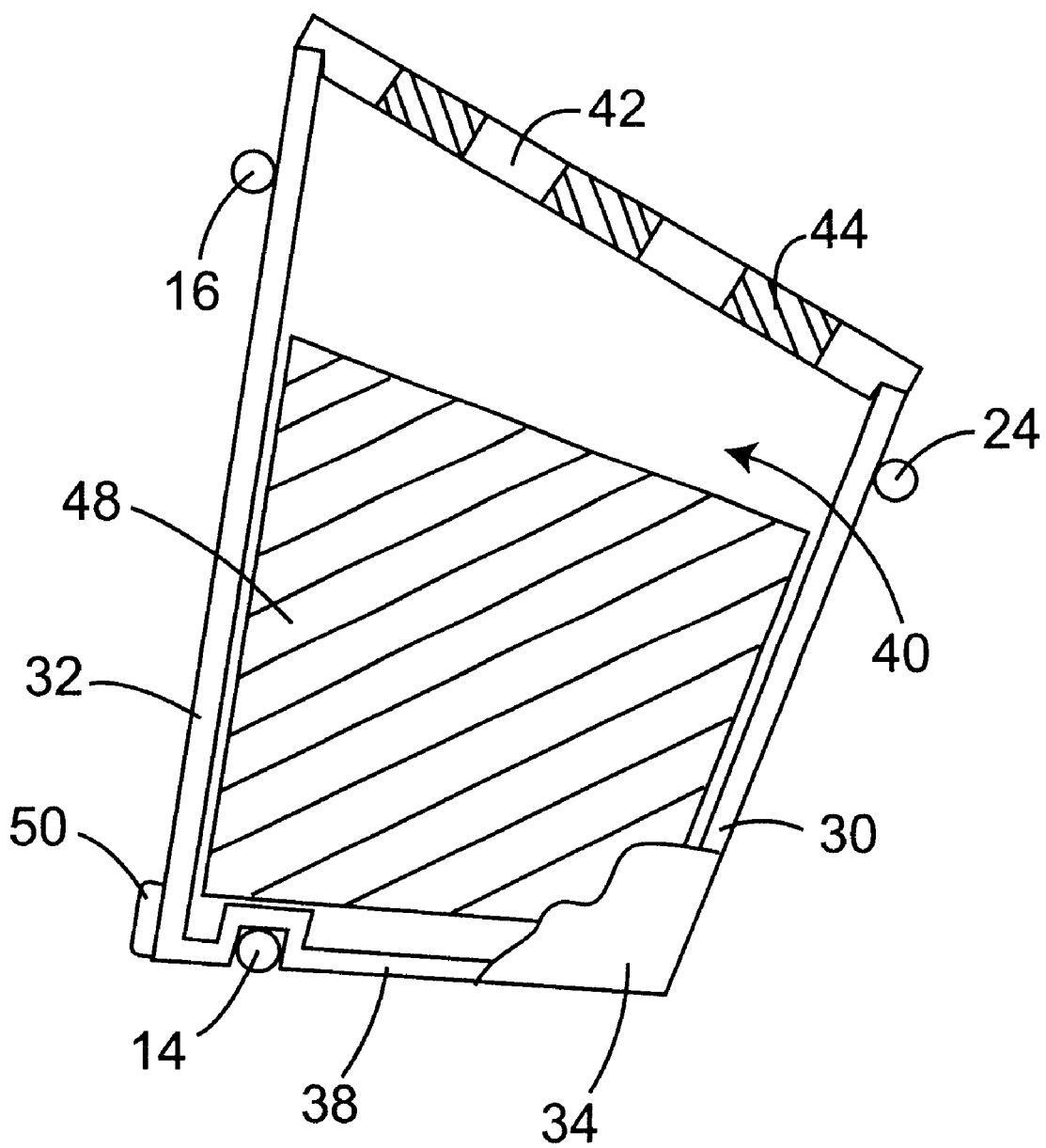

DECORATIVE WREATH

BACKGROUND OF THE INVENTION (1) Field of the Invention

The present invention relates to a decorative wreath of the type used to commemorate holidays and other occasions, and in particular to an artificial wreath that can be easily modified to render the wreath suitable for different occasions.

(2) Description of the Prior Art

Wreathes are often used to decorate the home or other location in celebration of various holiday seasons, such as Christmas or Halloween. Wreaths are also used to commemorate solemn occasions, such as a death in the family.

Generally, decorative wreathes are comprised of a support frame that is covered with plant material. A hanger, generally in the form of a hook or loop, is attached to the back of the frame for use in hanging the wreath on a wall, door, etc. The plant material may be natural plant material. However, to avoid the cost of a new wreath each time an occasion arises, the wreath frame is often covered with artificial plant material, such as artificial foliage. While artificial decorative wreathes may be more expensive initially, the wreathes can be used for several years, substantially reducing the cost on a per use basis.

However, artificial wreaths are generally designed to be used as decoration for a single seasonal event or other occasion, such as Christmas, necessitating the purchase of a different artificial wreath for a different occasion, thereby defeating any cost savings. Moreover, since the same wreath is used numerous times, the user may desire a fresh, updated look. Finally, while artificial decorative wreaths are now designed to closely approximate the appearance of natural wreaths, often requiring careful visual examination, or even touching of the wreath, to tell the difference, there are still times when the use of natural plant material is desirable.

SUMMARY OF THE INVENTION

The present invention is directed to an artificial wreath that can be readily modified to render the wreath suitable for use as decoration for different occasions, thereby extending the usefulness of the wreath. More specifically, the present invention provides for an artificial wreath that includes a holder for adding artificial foliage, natural foliage, or a combination of artificial and natural foliage. Optionally, the wreath may include attachment pins or prongs for adding other seasonally decorative material to the wreath.

More specifically, the wreath includes a support frame with a back frame section with a lower surface, and a front frame section connected to the back frame section. In the preferred embodiment, the back frame section is comprised of an outer back loop having a first diameter and an inner back loop having a second diameter less than the first diameter. The front frame section is comprised of a front loop having a third diameter intermediate the diameter of the outer and inner back loops. The three loops preferable have a common axis. Connectors join the back loops to the front loop.

The loops are normally formed of a closed loop of wire or other rodlike material, which may be covered to simulate the branches of a plant. In most instances the loops will be circular. However, it is to be understood that the loops may be rectangular, oval, triangular, or of another shape. One of the back loops may include a hanger, e.g., a hook or small loop, for use in attaching the wreath to a vertical surface.

The plant material holder is comprised of a continuous side wall and a bottom wall that together define a plant material receiving chamber with an open top. The chamber may be watertight so that water can be provided for natural plant material or may include a foam block to the type commonly used by florists to facilitate positioning of the natural and/or artificial plant material. The holder is mounted adjacent the bottom of the frame between the front and back frame sections of the wreath frame. When the frame is covered with plant foliage, the holder is nestled within the foliage, so that the holder is largely invisible to the casual observer.

Preferably, the holder is a rectangular holder comprised of a rear wall, a front wall, side walls joining the rear and front walls, and a bottom wall. The rear wall is desirably of a greater height than the front wall, so that the open top of the holder tilts toward the front of the wreath, providing a larger surface area and greater visibility of plant material in the holder. The holder may also include a perforated removeable cover that fits over the open top, with the plant material being inserted through openings in the cover into the holder chamber. Preferably, the cover includes a plurality of first openings of one dimension and a plurality of opening of a second, smaller dimension to facilitate insertion of material of different stem sizes.

When the preferred holder is inserted into the preferred frame structure, the holder rear wall engages the frame inner back loop, the holder front wall engages the frame front loop, and the holder bottom wall is supported on the lower section of the frame outer back loop. The holder bottom wall may include a slot on its lower surface into which the lower section of the frame outer back loop is inserted to secure the holder in place. In order to facilitate insertion of a larger holder, the front loop may include a lower section that extends outwardly from the front of the wreath from the plane of the rest of the front loop, with the holder being inserted behind this lower section of the front loop.

The wreath may also include bumpers or stops extending from the back of the wreath to protect the wall, door or other object against which the wreath is placed. The wreath may also include a plurality of pins or prongs that extend from the wreath frame toward the front of the wreath to provide further opportunities for changing the appearance of the wreath. These pins may be used to removeably attach seasonal three-dimensional objects, such as Santa figures or pumpkin figures, or natural items, such as apples, to the wreath. In the preferred embodiment, a plurality of these pins may extend toward the front of the wreath from one or more of the loops.

Thus, the basic wreath is comprised of a frame having a lower section into which the holder is inserted. The front of the frame is covered with artificial foliage, and artificial and/or natural plant material is placed into the holder chamber. If desired, the perforated cover can be placed over the chamber, with the plant material being inserted through the cover. Due to the shape and positioning of the holder, the plant material blends with the artificial foliage on the wreath frame to provide a wreath with an integrated appearance. Optionally, seasonal objects can be attached to the projecting pins. When a different visual appearance is desired, the plant material in the holder can be replaced with a different plant material, and the seasonal objects can be replaced with objects appropriate to the different season.

BRIEF DESCRIPTION OF THE DRAWINGS

FIG. 4 is a section through the center of the holder.

DETAILED DESCRIPTION OF THE INVENTION

Figure 1:
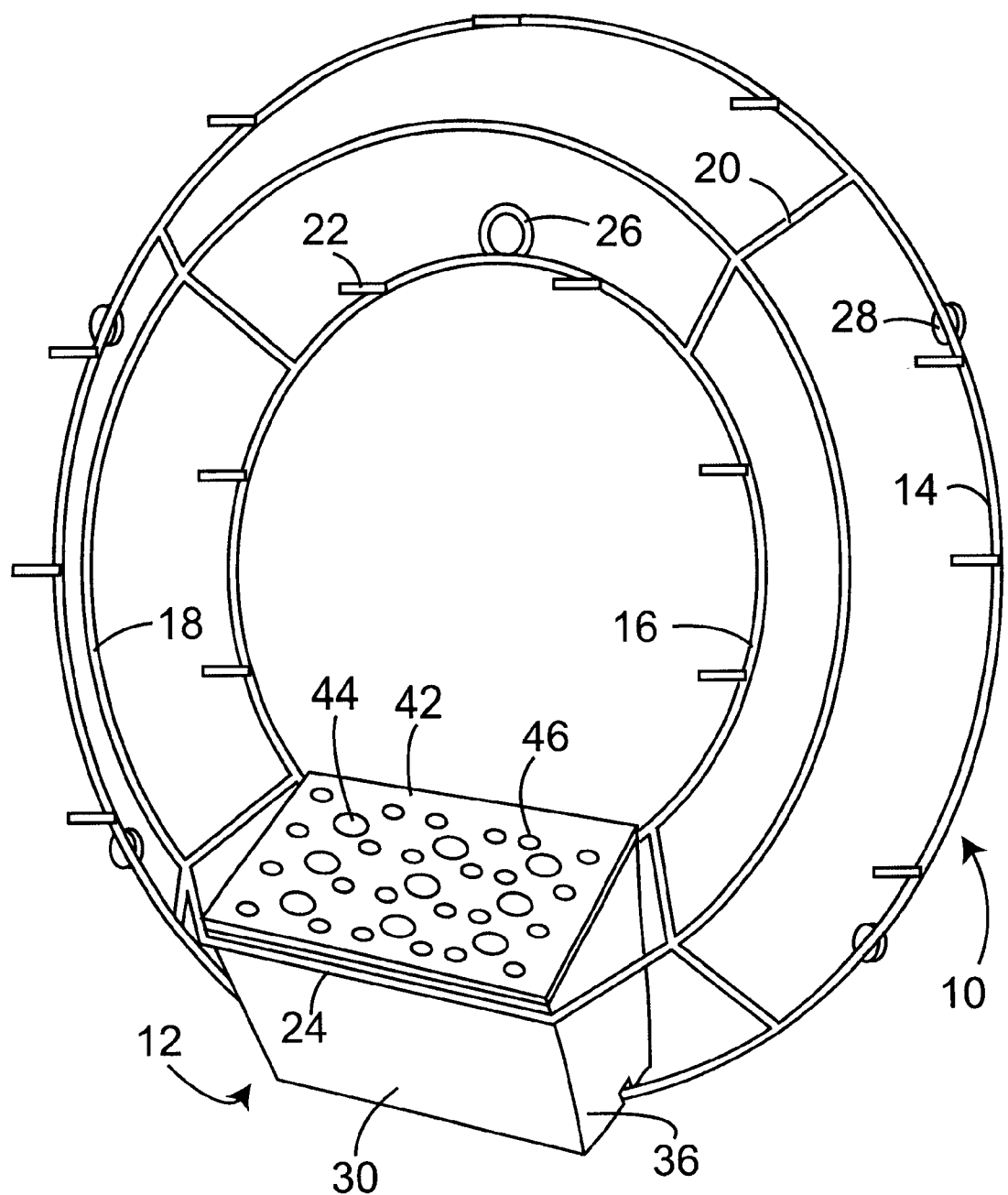
FIG. 1 is a perspective view of the wreath of the present invention with the artificial foliage and plant material removed to facilitate viewing of the wreath frame.
Figure 2:
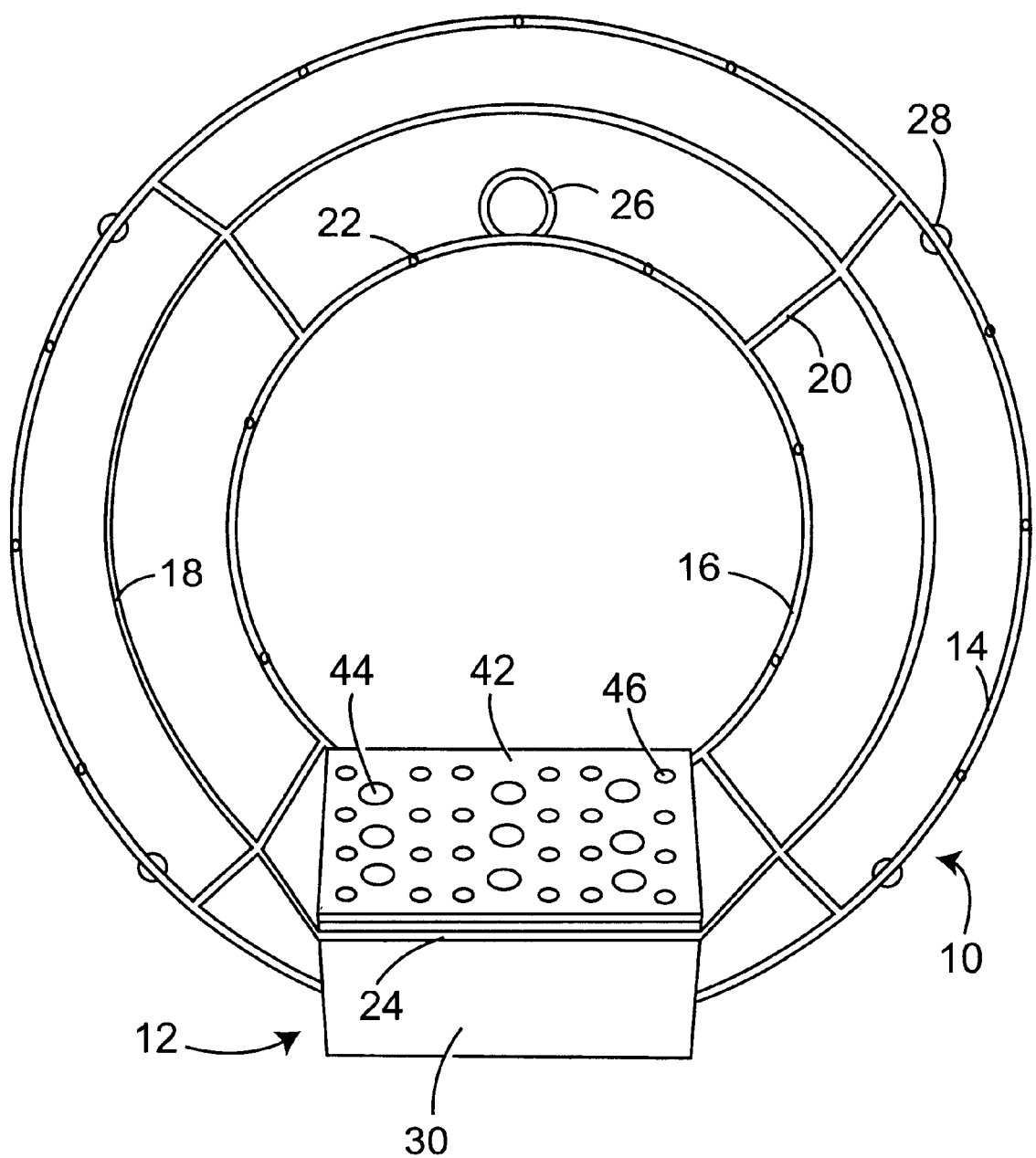
FIG. 2 is a front view of the wreath with the artificial foliage and plant material removed to facilitate viewing of the wreath frame.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

As illustrated in the drawings, the preferred wreath of the invention is comprised of a frame, generally 10, into which is mounted a plant holder, generally 12. Frame 10 is comprised of a back section formed of circular outer loop 14 having a first diameter and circular inner loop 16 having a second diameter smaller than the first diameter, and circular front loop 18, which is spaced forward of loops 14 and 16. Loops 14 and 16 lie in a common plane, while loop 18 lies in a plane parallel to the plane of loops 14 and 16. Loops 14, 16 and 18 have a common axis. Loops 14 and 16 are attached to loop 18 with connectors 20. A plurality of pins 22 extend perpendicularly from loops 14 and 16 toward the front of the wreath for attachment of removeable seasonal decorative objects. Lower section 24 of front loop 18 extends forward from the plane of loop 18 to provide an enlarged area for insertion of holder 14.

Frame 10 further includes hanger 26 for attaching the wreath to a surface, and a plurality of bumpers or stops 28 extending from the back of the wreath to keep the wreath from scratching the attachment surface. Frame 12 may be covered with a coating or covering material to simulate natural foliage branches.

Holder 14 is comprised of a front wall 30, rear wall 32, side walls 34 and 36, and bottom wall 38, which together define an interior chamber 40 having an open top. Rear wall 32 is of a greater height than front wall 30, resulting in the top of chamber 40 being angled or tilted toward the front of the wreath. As a result, the top opening encompasses a larger surface area, so that a greater volume of plant material within holder 14 is visible to the front of the wreath. The top of holder 14 may be covered with perforated cover 42, which includes a plurality of first holes 44 having a first diameter, and a plurality of second holes 46 having a second diameter smaller that the first diameter. Removable foam block 48 is shown positioned within chamber 40. A bumper or pad 50 is attached to the back of rear wall 32 to protect the surface on which the wreath is hung.

Figure 3:
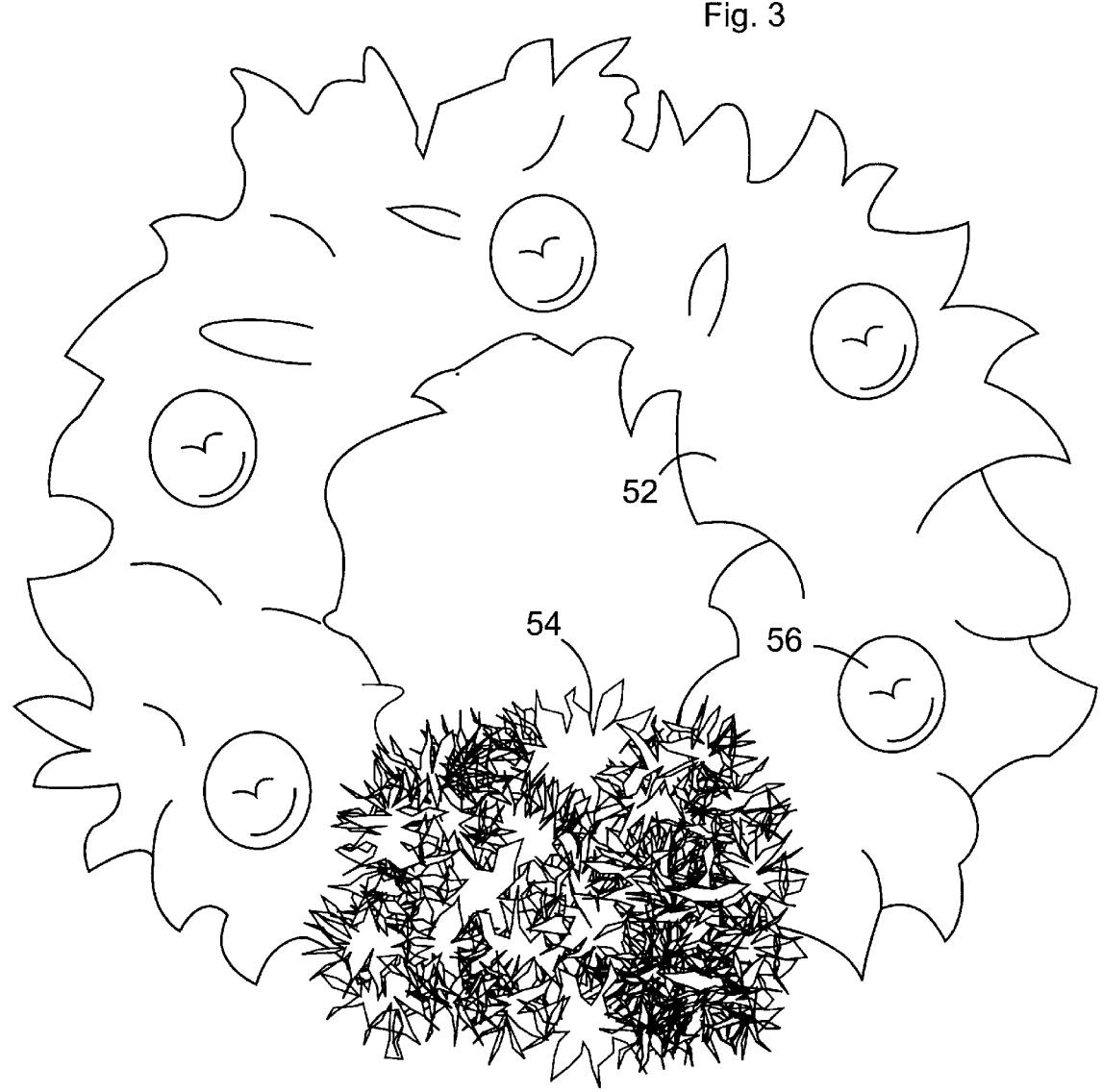
FIG. 3 is a front view of the wreath with artificial foliage attached to the wreath frame and plant material inserted into the holder chamber.

FIG. 3 illustrates the completed wreath with plant foliage 52 attached to frame 10 and plant material 54 inserted into holder 12. Apples 56 are shown on some of pins 22. It will be understood that plant material 54 and apples 56 may by replaced with different plant material and objects, respectively, to produce a wreath with a different appearance appropriate to a different season or occasion.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A decorative wreath having a front, a back, an upper end, and a lower end comprising:
   a) a back frame section with a lower portion;
   b) a front frame section connected to said back frame section; and
   c) a plant material holder inserted between said back and front frame sections at the lower end of said wreath, said holder including a back wall engaging said back frame section, a front wall engaging said front frame section, a bottom wall supported by said back frame section lower portion, and a plant material chamber with an open top.

2. The wreath of claim 1, wherein said back frame section includes an outer back loop having a first diameter, and an inner back loop having a second diameter less than said first diameter, said holder bottom wall being supported on said outer back loop.

3. The wreath of claim 1, further including attachment pins extending toward the front of said wreath.

4. The wreath of claim 1, further including a hanger attached to said back wreath section.

5. The wreath of claim 1, further including bumpers attached to the back of said wreath.

6. The wreath of claim 1, further including a plant holder cover, said holder cover having openings for insertion of plant material into said holder.

7. The wreath of claim 1, further including artificial foliage attached to at least one of said frame sections.

8. The wreath of claim 1, further including plant material extending from said holder.

9. A wreath having a front, back, top and bottom comprising:
   a) an outer back loop having a first diameter;
   b) an inner back loop having a second diameter less than said first diameter;
   c) a front loop having a third diameter intermediate said first and second diameters, said loops having a common axis; and
   d) a plant holder supported on said outer rear loop and between said inner back loop and said front loop, said plant holder includes front, side and bottom walls defining a chamber with an open top.

10. The wreath of claim 9, further including a holder cover positioned over said top, said cover having openings for insertion of plant material through said cover and into said chamber.

11. The wreath of claim 9, wherein said holder rear wall has a given height and said holder front wall has a height less than said given height, whereby said open top is inclined toward the front of said wreath.

12. The wreath of claim 9, wherein said holder bottom wall is slotted to receive said outer rear loop.

13. The wreath of claim 9, further including pins extending from at least one of said loops toward the front of said wreath.

14. The wreath of claim 9, further including a hanger attached to the top side of one of said back loops.

15. The wreath of claim 9, further including bumpers on the back of said wreath.

16. A wreath having a front, back, top and bottom comprising:
   a) an outer back loop having a first diameter;
   b) an inner back loop having a second diameter less than said first diameter, said outer and inner back loops being in a common first plane;

c) a front loop having a third diameter intermediate said first and second diameters, said front loop being in a second plane spaced from and parallel to said first plane, said loops having a common axis;

d) connectors joining said back loops to said front loop;

e) a plant holder supported on said outer rear loop and between said inner loop and said front loop, said plant holder includes front, side and bottom walls defining a chamber with an open top;

f) a perforated cover positioned over said open top; and g) attachment pins extending toward the front of said wreath from at least one of said loops.

17. The wreath of claim 16, wherein said cover includes a plurality of first openings of a first diameter and a plurality of second openings of a second diameter, said second diameter being less than said first diameter.

18. The wreath of claim 16, including artificial foliage attached to said loops, and plant material inserted into said chamber through said cover openings.

19. The wreath of claim 16, wherein said front loop includes a lower section projecting toward the front of said wreath from said second plane, said holder being positioned behind said lower section.

20. The wreath of claim 18, wherein said plant material is natural plant material.

* * * * *